Figure 1:
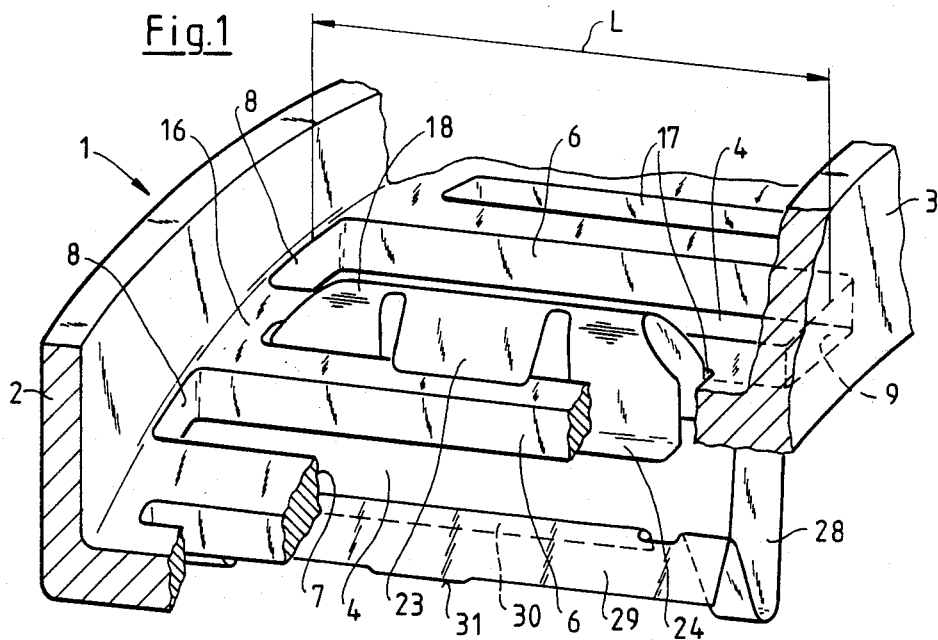

United States Patent [19]

Hartig

[11] Patent Number: 4,867,292
[45] Date of Patent: Sep. 19, 1989

[54] OVERRUNNING CLUTCH WITH LOCKING ELEMENTS

[75] Inventor: Günter Hartig, Nuremberg, Fed. Rep. of Germany

[73] Assignee: INA Walzlager Schaeffler KG, Fed. Rep. of Germany

[21] Appl. No.: 234,397

[22] Filed: Aug. 19, 1988

[30] Foreign Application Priority Data

Sep. 4, 1987 [DE] Fed. Rep. of Germany ....... 3729632

[51] Int. Cl.⁴ ............................................. F16D 41/07
[52] U.S. Cl. .................................. 192/41 A; 192/44; 192/45; 192/45.1; 188/134
[58] Field of Search ................ 192/41 A, 44, 45, 45.1; 188/134

[56] References Cited

U.S. PATENT DOCUMENTS

| | | | |
|---|---|---|---|
| 2,744,598 | 5/1956 | Troendly | 192/45.1 |
| 2,753,027 | 7/1956 | Troendly et al. | 192/45.1 |
| 2,824,635 | 2/1958 | Troendly et al. | 192/45.1 |
| 3,031,053 | 4/1962 | Sauzedde et al. | 192/45 |
| 3,598,212 | 8/1971 | Giese | 192/41 A |
| 3,630,330 | 12/1971 | Pflugner | 192/45 |
| 3,651,908 | 3/1972 | Oldfield | 192/45.1 |
| 4,252,221 | 2/1981 | Lanzerath et al. | 192/41 A |
| 4,347,920 | 9/1982 | Bordes | 192/41 A |
| 4,422,537 | 12/1983 | Ritter et al. | 192/45 |
| 4,712,661 | 12/1987 | Lederman et al. | 192/44 |

*Primary Examiner*—Leslie A. Braun
*Assistant Examiner*—Nicholas Whitelaw
*Attorney, Agent, or Firm*—Bierman & Muserlian

[57] ABSTRACT

Overrunning clutch with locking elements securely retained by a respective spring element in pockets having plane end faces and being part of a one-piece unitary cage which spring element includes a spring section extending axially adjacent to the locking element and having a projection which acts upon the locking element with a spring force in the direction of engagement and a restraining area supported by the unitary cage, characterized in that the spring element (18) is made of flat material and the spring section (20) is defined by at least one bend (27,28) of the flat material, that the bend (27,28) extends in the area between the one radial plane (10 and 11, respectively) in which the frontal outer surface of the unitary cage (1) extends and the one radial plane (12 and 13, respectively) in which the end faces (8 and 9, respectively) of the pockets (4) near this outer surface extend with the greatest axial inside width (L), and that the restraining area (19) is retained in a self-locking manner on the unitary cage (1).

15 Claims, 5 Drawing Sheets

OVERRUNNING CLUTCH WITH LOCKING ELEMENTS

STATE OF THE ART

An overrunning clutch with locking elements securely retained by a respective spring element in pockets having plane end faces and being part of a one-piece unitary cage which spring element includes a spring section extending axially adjacent to the locking element and having a projection which acts upon the locking element with a spring force in the direction of engagement and a restraining area supported by the single cage is described in DE-AS No. 1,915,567 wherein the spring elements are defined as volute springs of wire material. These volute springs are loosely placed on lugs of the cage which project into the pockets and the volute spring thus requires structural space within the pocket. The greatest axial length of the pocket is thus not fully usable by the locking element.

Attachment of the volute springs to the cage is complicated because the volute spring must be guided in an aligned manner to the lug and then placed thereon. A mechanical mounting is also made difficult by the fact that the volute springs are not securely retained to the cage when the locking elements are not yet inserted in the pockets.

DE-AS No. 2,027,763 describes an overrunning clutch with locking elements in which the spring elements are defined by leaf springs which extend in the circumferential direction between the locking elements and are retained between the locking elements at the cage by snap members. This arrangement of the spring elements limits the structural space usable by the locking elements in the circumferential direction.

OBJECTS OF THE INVENTION

It is an object of the invention to provide an overrunning clutch of the above-stated type in which the mounting of the spring elements and of the locking elements is simplified and in which the spring elements are arranged so that the locking elements can use the maximum structural space in the axial direction and in the circumferential direction.

These and other objects and advantages of the invention will become obvious from the following detailed description.

THE INVENTION

The novel overrunning clutch of the invention with locking elements securely retained by a respective spring element in pockets having plane end faces and being part of a one-piece unitary cage which spring element includes a spring section extending axially adjacent to the locking element projection which acts upon the locking element with a spring force in the direction of engagement and a restraining area supported by the unitary cage, characterized in that the spring element (18) is made of flat material and the spring section (20) is defined by at least one bend (27,28) of the flat material, that the bend (27,28) extends in the area between the one radial plane (10 and 11, respectively) in which the frontal outer surface of the unitary cage (1) extends and the one radial plane (12 and 13, respectively) in which the end faces (8 and 9, respectively) of the pockets (4) near this outer surface extend with the greatest axial inside width (L), and that the restraining area (19) is retained in a self-locking manner on the unitary cage (1).

During assembly, the spring element f flat material can easily be handled mechanically and after being inserted into the cage, the spring element is securely retained even before the insertion of the locking elements which considerably facilitates the assembly.

Figure 2:
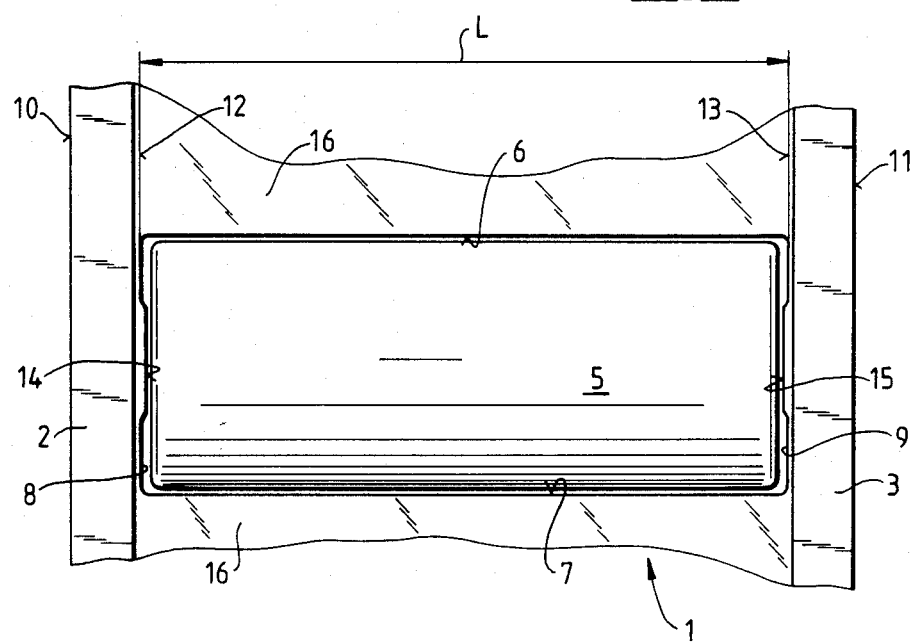
Figure 3:
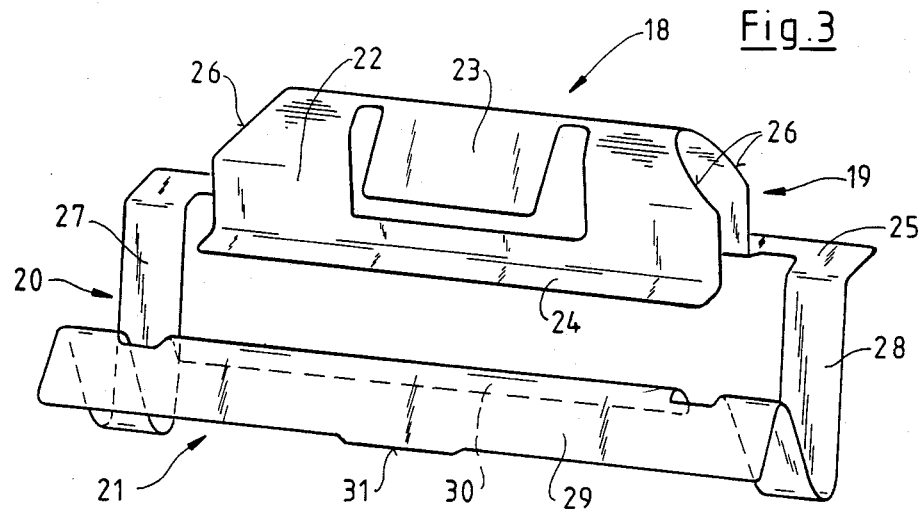
Figure 4:
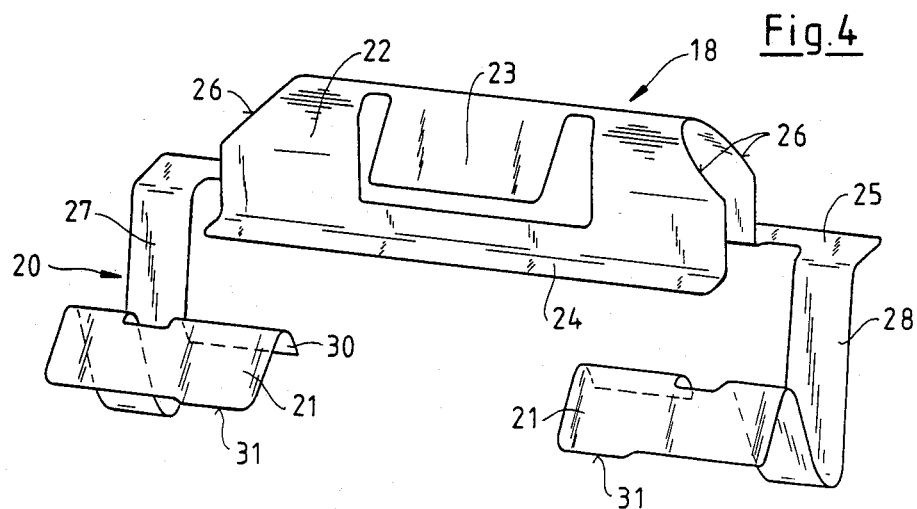
Figure 5:
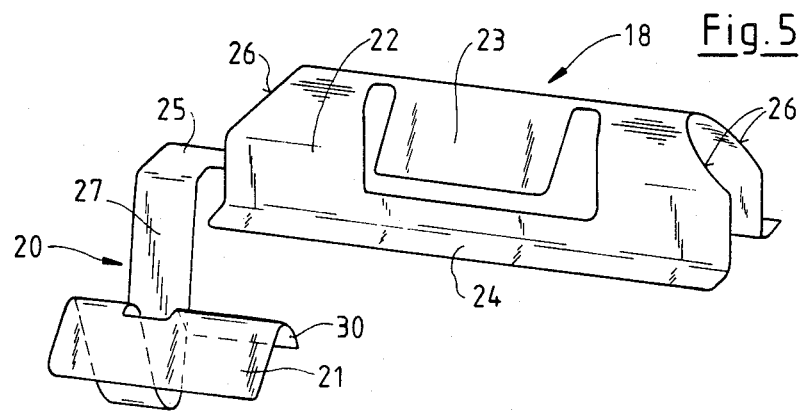
Figure 6:
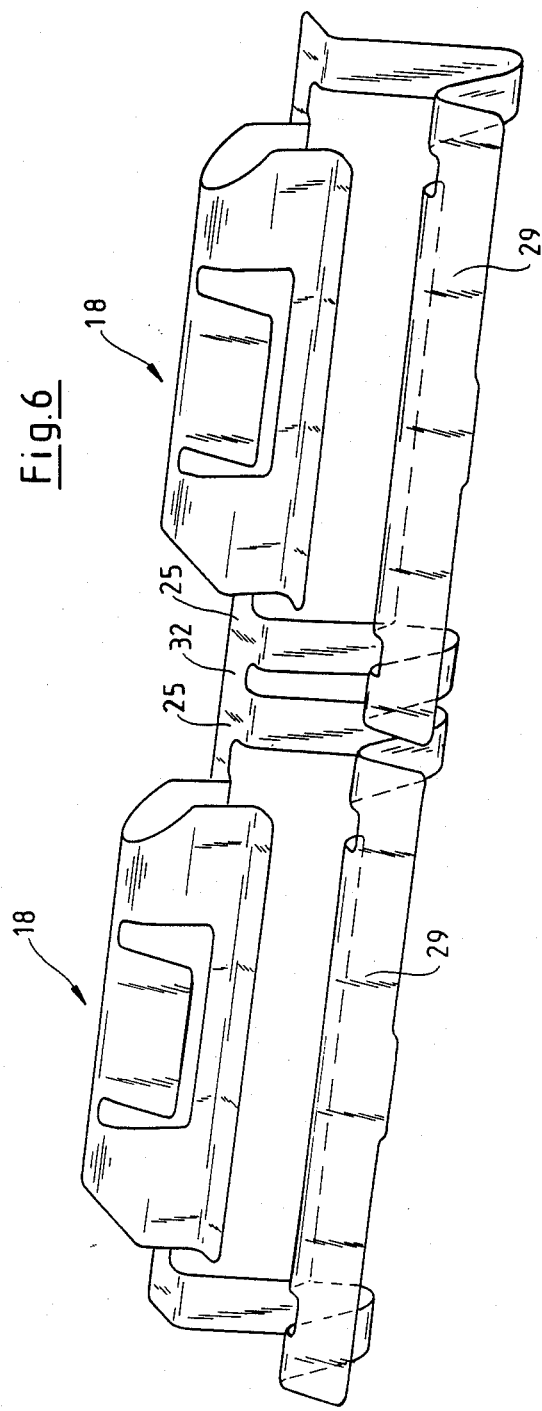
Figure 7:
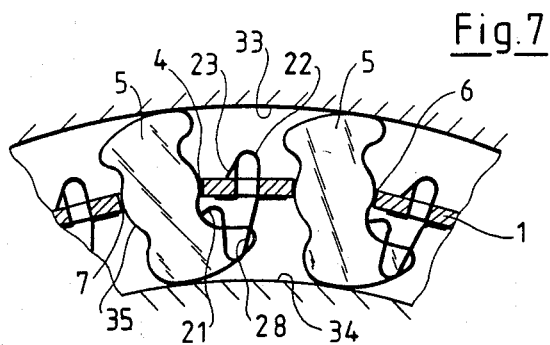
Figure 8:
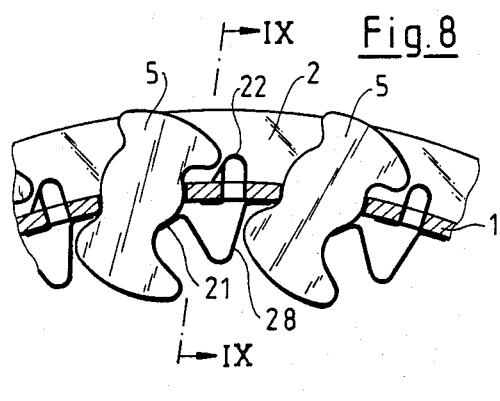
Figure 9:
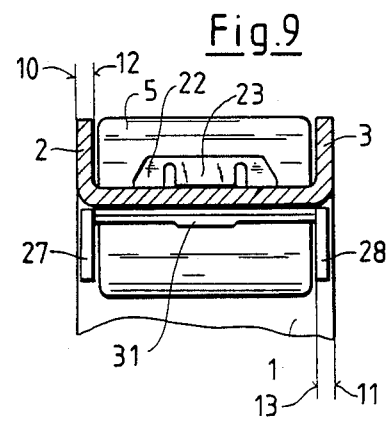
Figure 10:
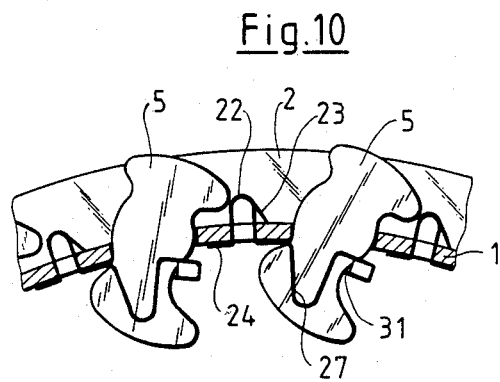
Figure 11:
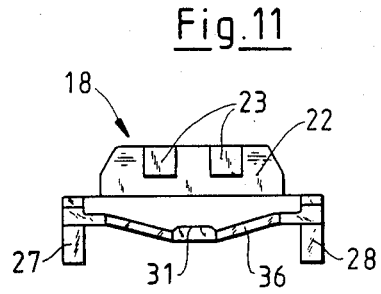
Figure 12:
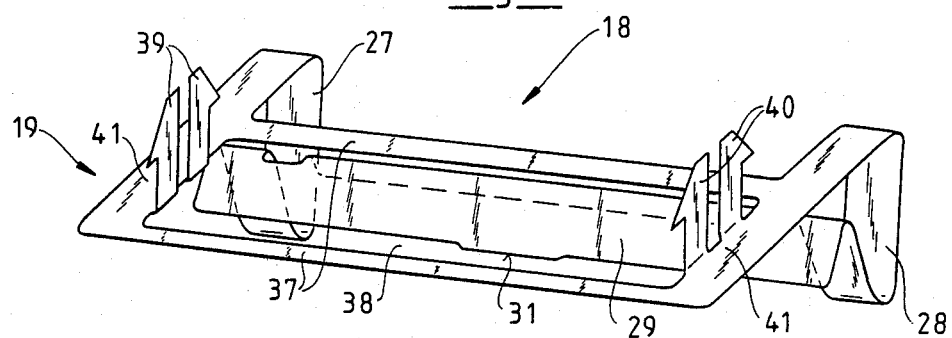
Figure 13:
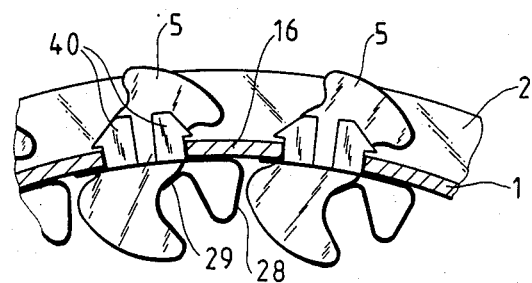

The bend defining the spring section extends outside the pocket axially near the locking element and radially next to the end face of the cage, thus in an area in which the locking element is not placed anyway, thereby ensuring an optimum use of the structural space by the locking elements in case of need. The locking elements may thus be arranged adjacent to each other in the circumferential direction since the spring section of the spring element does not extend therebetween. In the axial direction, the locking elements can use the maximum inside width of the pocket. Referring now to the drawings:

FIG. 1 is a partial cross-sectional view of a unitary cage having a spring element without a locking element, FIG. 2 is a partial cross sectional view of a unitary cage with the locking element inserted, FIG. 3 is a view of a spring element, FIG. 4 is a modification of the spring element, FIG. 5 is a further modification of the spring element, FIG. 6 illustrates a double spring element, FIG. 7 is a partial cross-sectional view of an overrunning clutch when assembled, FIG. 8 is a partial cross-sectional view of the overrunning clutch in the disassembled state, with the spring elements applying pressure to the locking elements, FIG. 9 is a view taken along the line IX—IX of FIG. 8, FIG. 10 is a view of FIG. 8 with the spring elements acting against the locking elements by tension, FIG. 11 is a view of a spring element of FIG. 10, FIG. 12 is a further embodiment of a spring element and FIG. 13 is a partial cross sectional view of an overrunning clutch with a spring element of FIG. 12.

In FIG. 1 the unitary cage (1) includes rims (2,3) and has pockets (4) for housing locking elements (5) and the pockets (4) are defined by flat lateral surfaces (6,7) and frontal end faces (8,9). The greatest inside width (L) is between the frontal end faces (8,9). The frontal outer surface of one of the rims (2) and thus of the unitary cage (1) extends in a radial plane (10) and the other frontal outer surface of the unitary cage (1) and thus of the rim (3) extends in a radial plane (11). The frontal ends faces (8) of the pockets (4) extend in the area of the greatest axial inside width (L) in a radial plane (12) and the frontal end faces (9) extend correspondingly in a radial plane (13). In the embodiment of FIG. 2, contact surfaces (14) are formed at the end faces (8) and slightly project into the pockets (4) and corresponding contact surfaces (15) are formed at the end faces (9).

The unitary cage (1) is, for example punched form flat material, rolled and welded. Extending between the pockets (4) are crossbars (16) provided with axial slots (17) which interrupt the crossbars (16) so that during making through rolling they have a corresponding bend i.e. the cage is not of polygonal shape.

Each locking element (5) is associated with a spring element (18) which is bent from a resilient flat material and includes a restraining area (19), a spring section (20) connected to the latter and a prolongation (21) which acts upon the locking element (5) in the direction of engagement by the spring force of the spring section (20).

In the embodiments of FIGS. 1 to 11, the restraining area (19) is defined by a U-shaped clip (22) which includes a tongue (23). The clip (22) has one shank provided with an angled area (24) and one shank of the clip (22) is connected to the spring section via a bridge (25). The clip (22) is practically as long as the slot (17) thereby ensuring the axial fixation of the spring element (18) in the slot (17). To facilitate its insertion, the clip (22) is provided with slanted edges (26).

The spring element (18) can be easily attached to the unitary cage (1) by being axially introduced into the cage (1) and then radially inserted into the slot (17) until the angled area (24) and the bridge (25) bear internally against the crossbar (16), with the tongue (23) snapping externally on the crossbar (16). The fit can be improved by a certain spring force of the clip (22). The spring elements are thus attached to the unitary cage (1) in self-locking manner even when the locking elements (5) are not yet inserted. After snapping the spring elements (18) into the slots (17), the locking elements (5) are inserted into the pockets (4), with the locking elements (5) bearing against the prolongations (21) so that they are acted upon in the direction of engagement by the spring force of the spring sections (20).

The spring section (20) is defined by a V-shaped bend (27,28). The bend (27) extends into the space between the radial plane (10) and the radial plane (12) and the bend (28) extends into the space between the radial plane (11) and the radial plane (13). Thus, the bends (27,28) extend next to the locking elements (5), and thence do not limit the possible axial length of the locking elements. This is favorable in the event the locking elements (5) should fill the unitary cage (1) as much as possible for transmission of high forces. Since the resilient bends (27,28) are also not arranged between adjoining locking elements (5), the structural space of the unitary cage (1) is used as much as possible also in the circumferential direction.

In the embodiment of FIGS. 1 and 3, the prolongations (21) of the bend (27,28) are defined by a continuous crosspiece (29) which is reinforced by a rib (30) and includes a central projection (31) for bearing against the locking elements (5). In the embodiment of FIG. 4, the prolongations (21) of the bends (27,24) are separate and in the embodiment of FIG. 5, there is a resilient bend only at one side.

Illustrated in FIG. 6 is a double spring element which includes two spring elements (18) of FIG. 3 that are connected to each other via a link (32). This double spring element is used in an unitary cage with two rings of locking elements. A multiple spring element may also be structured in a corresponding manner.

FIG. 7 illustrates a unitary cage (1) which is installed between two races (33,34) and the spring elements (18) press with their prolongations (21) in the direction of engagement against the locking elements (5). The locking elements (5) are solid bodies without slots, bores or journals and are supported with an enlargement (35) in the pocket (4). The projection (2I) applies pressure to the locking elements (5) so that the enlargement (35) is supported by the opposing end face (7) of the unitary cage (1) as viewed in the circumferential direction.

FIGS. 8 and 9 illustrate the unitary cage (1) in a state in which it is not yet installed between the races. By means of the spring elements (18) which apply pressure to the locking elements (5), the latter are respectively tilted and thus securely retained. The bends (27,28) extend between the radial planes (10,12 and 11,13, respectively) )(compare FIG. 9) and between the locking elements (5) (compare FIG. 8).

FIGS. 10 and 11 illustrate a spring element (18) which embraces the associated locking element (5) and the crosspiece (29) acts under tension upon the locking element (5). The crosspiece includes a flexion (36) and is provided at a central location with the projection (31) which bears against the locking element (5) thereby attaining a self-alignment of the locking element (5).

In the above embodiments, the restraining area (19) is attached to the slot (17). In the event, the unitary cage (1) does not have the slots (17), a spring element (18) can be used as in FIGS. 12 and 13. The restraining area (19) of this spring element (18) defines a closed frame (37) with an opening (38) being aligned with the pocket (4) when attached to the unitary cage (1) (compare FIG. .13) and at each side of the frame (37) are double hooks (39,40).

The spring element (18) is pushed with the double hook (39,40) through the respective pocket (4) and the frame (37) thus bears on the inside of the crossbar (16) in the vicinity of the pocket (4). The double hooks (39,40) overlap the crossbars (16) from atop and locking of the plane double hooks (39,40) is possible by the resiliency in the areas (41) of the frame (37). After the spring elements (18) have been snapped in, the locking elements (5) are inserted into the pockets (4). They are then securely retained by the crosspiece (29).

It is not required to provide the spring section (27 and 28, respectively) by only one bend of the flat material. It may have several bends so as to be of W-shape or Z-shape. It is also possible to make the cage (1) and the spring elements (18) together of one piece of plastic material.

Various modifications of the overrunning clutch of the invention may be made without departing from the spirit or scope thereof and it should be understood that the invention is intended to be limited only as defined in the appended claims.

What I claim is:

1. Overrunning clutch with locking elements securely retained by spring elements in pockets, said pockets having plane end faces and being part of a one-piece unitary cage, whereby every spring element includes a spring section extending axially adjacent to the locking element, said spring element having at its spring section a prolongation which acts upon the locking element with a spring force in the direction of engagement and a restraining area supported by the unitary cage, characterized in that the spring element (18) is made of flat material and the spring section (20) is defined by at least one bend (27,28) of the flat material, that the bended spring section (20) lies in the area between the one radial plane (10 and 11, respectively) in which the frontal outer surface of the unitary cage (1) extends and the one radial plane (12 and 13, respectively) in which the end faces (8 and 9, respectively) of the pockets (4) near said outer surface of the unitary cage (1) extend, and that the restraining area (19) is retained in a self-locking manner on the unitary cage (1).

2. An overrunning clutch of claim 1 characterized in that at least one bend (27,28) is of the spring section (20) provided at both sides of the spring element (18).

3. An overrunning clutch of claim 2 characterized in that the prolongations (21) of the bended spring section (20) at both sides are connected by a crosspiece (29).

4. An overrunning clutch of claim 3 characterized in that the crosspiece (29) includes a rib (30) for reinforcement thereof.

5. An overrunning clutch of claim 3 characterized in that the crosspiece (29) includes at a central location thereof a projection (31) as support for the locking element (5).

6. An overrunning clutch of claim 3 characterized in that the crosspiece (29) includes a flexion (36).

7. An overrunning clutch of claim 1 characterized in that at least two spring elements (18) define a one-piece multiple spring element by means of links (32).

8. An overrunning clutch of claim 1 characterized in that the restraining area (19) is attached to the unitary cage (1) by a snap connection.

9. An overrunning clutch of claim 8 characterized in that the restraining area (19) includes a bent clip (22) which is inserted in a slot (17) extending between adjacent pockets (4).

10. An overrunning clutch of claim 9 characterized in that the clip (22) is provided with an angled area (24) and a resilient tongue (23) which embrace a crossbar (16) of the unitary cage (1) in a form-fit manner.

11. An overrunning clutch of claim 9 characterized in that the clip (22) has inclined sections (26).

12. An overrunning clutch of claim 9 characterized in that the clip (22) is connected to the bended spring section (20) via a bridge (25).

13. An overrunning clutch of claim 1 characterized in that the restraining area includes a frame (37) which has an opening (38) aligned with the end faces (6 to 9) of the pocket (1), and that the frame (37) is provided with hooks (39,40) which overlap the crossbars (16) between the pockets (4).

14. An overrunning clutch of claim 1 characterized in that the bended spring section (20) exerts tensile force to the locking element via the projection (31).

15. An overrunning clutch of claim 1 characterized in that the bended spring section (20) applies pressure to the locking element by the prolongation (21).

* * * * *